United States Patent

Nord

[11] 4,341,235
[45] Jul. 27, 1982

[54] DEVICE FOR CONNECTING A PRESSURE FLUID SOURCE TO A FLUID MOTOR

[75] Inventor: Rune Nord, Vasa, Finland

[73] Assignee: Torbjörn Nord, Stockton, Calif.

[21] Appl. No.: 202,651

[22] Filed: Oct. 31, 1980

[30] Foreign Application Priority Data

Oct. 31, 1979 [SE] Sweden ............................ 7909030

[51] Int. Cl.³ ..................... F16K 17/40; F16K 31/122
[52] U.S. Cl. ................................ 137/312; 91/468; 137/498; 137/505.25
[58] Field of Search ................. 91/445, 468; 137/312, 137/459, 460, 505.25, 498; 285/133 R, 149

[56] References Cited

U.S. PATENT DOCUMENTS

| | | | |
|---|---|---|---|
| 3,344,807 | 10/1967 | Lehrer et al. | 137/312 |
| 3,434,493 | 3/1969 | Owens | 137/460 |
| 3,890,999 | 6/1975 | Moskow | 137/505.25 |
| 4,004,607 | 1/1977 | Freese | 137/460 |
| 4,174,732 | 11/1979 | Freese | 137/498 |
| 4,257,449 | 3/1981 | Takagi | 137/505.25 |

FOREIGN PATENT DOCUMENTS

| | | | |
|---|---|---|---|
| 2360274 | 6/1975 | Fed. Rep. of Germany . | |
| 2522443 | 2/1976 | Fed. Rep. of Germany | 137/498 |
| 2823262 | 12/1979 | Fed. Rep. of Germany | 137/312 |
| 370111 | 9/1974 | Sweden . | |

Primary Examiner—George L. Walton
Attorney, Agent, or Firm—Hill, Van Santen, Steadman, Chiara & Simpson

[57] ABSTRACT

A device for connecting a hydraulic pump or other pressure fluid source to a working cylinder or other fluid motor comprises a pair of concentric hoses and a safety shut-off valve. One end of the inner hose is connected to the cylinder and the other end is connected to the pump by way of the safety shut-off valve. The space between the hoses normally is unpressurized and is in constant communication with a cavity containing a movable element of the shut-off valve. An elevated pressure in the space between the hoses will actuate the valve element for closing the shut-off valve. A second valve element is movable to close the valve when subjected to fluid flow forces resulting from an excessive flow of hydraulic liquid through the shut-off valve.

4 Claims, 1 Drawing Figure

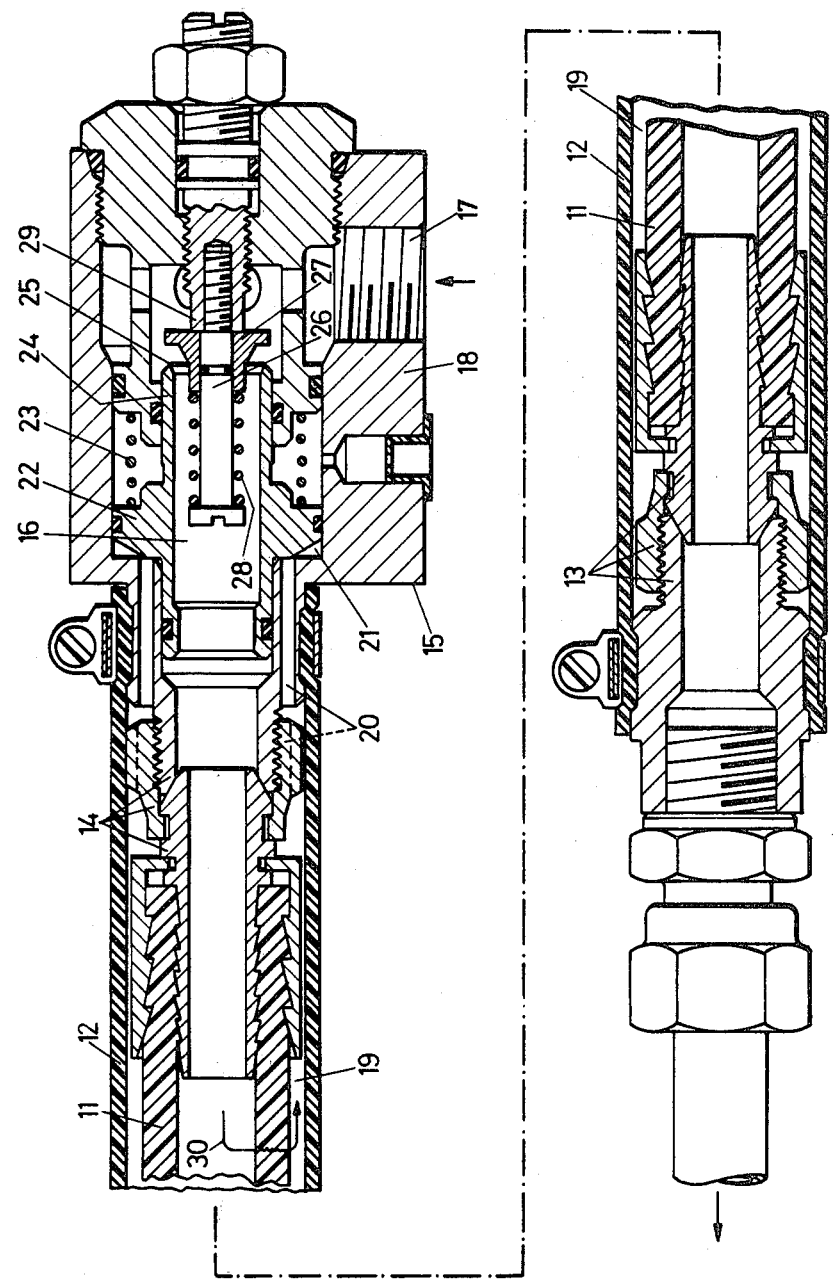

DEVICE FOR CONNECTING A PRESSURE FLUID SOURCE TO A FLUID MOTOR

BACKGROUND OF THE INVENTION

Field of the Invention

This invention relates to a valved conduit for connecting a pressure fluid source to a fluid motor and more particularly to a device which is responsive to abnormal flow conditions such as heavy or light leakage downstream of the valve to shut off the flow of pressure fluid through the conduit.

Prior Art

Such devices are useful in oil-hydraulic systems where hydraulic liquid under high pressure is conveyed from a pump or other pressure fluid source to a working cylinder or other fluid motor through a hose or other conduit exposed to danger of becoming damaged. Such systems may be embodied in, for example, a digger, a loader or other construction or working machine having arms or other movable elements actuated by fluid motors into and out of which hydraulic liquid is conveyed through hoses.

In such systems, the high pressure of the hydraulic liquid in combination with the stresses to which the hoses are otherwise subjected can easily cause the hoses to leak, so that the hydraulic liquid starts escaping in an uncontrolled manner. If the leak is not immediately discovered and sealed, the escaping hydraulic liquid may rapidly cause severe damage. If a hose should burst or break and the supply of hydraulic liquid to the hose is not immediately shut off, there is, in addition to environmental damage caused by the escaping hydraulic liquid, a substantial risk of serious personal injury or damage to equipment.

It is known in the art to provide hydraulically operated machine components with so-called excess-flow safety valves which serve to prevent uncontrolled escape of hydraulic liquid and accidents in case a hose should burst or break. Excess-flow safety valves of the conventional type may function well if the hose is broken or bursts and also in other instances in which the leakage is very large, namely, larger than the largest flow the valve has to pass during normal operation. On the other hand they are not capable of also providing reliable protection in the not uncommon case of a smaller leakage, e.g. as caused by a minor crack or pinhole in the hose. Even small leakages may rapidly cause severe damage, however, and an excess-flow safety valve therefore should be reliably actuated in response to a relatively small leakage as well.

SUMMARY OF THE INVENTION

The principal object of the invention is to provide a simple and reliably functioning device which may be used as an excess-flow safety valve and which is capable of responding reliably both to a very large leakage and a leakage substantially smaller than the normal flow between the source of pressure fluid and the fluid motor.

According to the invention, pressurized liquid is brought through an automatic shut-off valve which is responsive to leakage downstream thereof. To this end, a valve and a valve seat normally are open to enable flow therethrough, but each of the valve and the valve seat is mounted for independent movement toward the other. If the flow rate should increase beyond an acceptable maximum, then fluid flow forces will move the valve to a closed position. If a downstream hose or conduit should develop a slow leak, such leak is trapped by a substantially non-pressurized casing or conduit which surrounds the leaky hose. A pressure in such casing builds up and communicates with the movable wall of a chamber on which wall the valve seat is mounted. Such pressure will move the valve seat to closingly engage the valve. In either event, the closed valve assembly is held in a closed position by the incoming fluid pressure.

ON THE DRAWING

The single FIGURE shows an exemplary embodiment in longitudinal cross-section of a hydraulic fluid connector.

AS SHOWN ON THE DRAWING

The illustrated connector comprises a pair of hoses (or other conduits) of arbitrary length, namely, an inner hose 11, which is reinforced or otherwise constructed so as to withstand internal pressure on the order of magnitude that is common in oil-hydraulic systems of construction machines, for example, and a surrounding outer hose 12, which may, but need not, be capable of withstanding high internal pressures. One end of the inner hose 11 is in fluid flow communication with a hose coupling 13 leading to a fluid motor (not shown), such as a hydraulic working cylinder. A further hose coupling 14 forms part of and connects the inner hose 11 with a safety shut-off valve 15, namely, with one end of a flow-through passage 16 therein. The other end of the flow-through passage 16 is adapted to be connected to a source of pressure fluid (not shown), such as a hydraulic pump, at a connector port 17 in the valve housing 18.

The outer hose 12, which forms a sheath enclosing the inner hose 11, is clamped in fluid-tight manner to the couplings 13 and 14 and thus defines a sealed space 19 around the inner hose 11. This space 19 is in constant open communication with one side of a cavity 21 in the valve housing 18 through a passage 20 formed in the coupling 14.

The valve housing cavity 21 houses a piston 22 which is sealed with respect to the wall of the cavity and thus constitutes a movable wall of a sealed compartment communicating with the sealed space 19. The piston 22 is constantly urged by a spring 23 towards a rest position in which it engages the valve housing 18 at the side of the cavity 21 communicating with the space 19. The piston 22 has a central axial through bore forming a section of the flow-through passage 16 and it also has a neck or tubular extension 24 directed away from the just-mentioned side of the cavity 21. The outer end of the extension 24 forms an annular valve seat 25.

A rod-shaped valve body support 26 having an annular valve body 27 slidably mounted thereon extends coaxially into the section of the flow-through passage 16 formed by the piston 22 and the extension 24. The valve body 27 can be displaced against the action of a compression spring 28 toward the valve seat 25 to engage the valve seat in sealing relation therewith and thus block the flow-through passage 16. The spring 28 normally maintains the valve body 27 in the illustrated rest position in engagement with an abutment 29 which is adjustable so that the rest position spacing of the valve seat 25 and the valve body 27 may be adjusted.

The spring 28 is dimensioned to maintain the valve body 27 in its rest position in engagement with the abutment 29 as long as the piston 22 is in its rest position and the flow rate of the stream of hydraulic liquid passing from the pump to the working cylinder by way of the flow-through passage 16 does not exceed a given maximum permitted flow rate. If the flow rate should assume a larger value, e.g. as a result of bursting or breaking of the hoses 11 and 12 and a consequent almost unrestricted escape of the hydraulic liquid from the inner hose 11, the fluid force acting on the valve body 27 in the direction of flow will overcome the force of the spring 28 and displace the valve body 27 into sealing engagement with the valve seat 25 so that the flow-through passage instantaneously becomes blocked. The liquid pressure in the port 17 then maintains the valve body 27 in the blocking position.

The space 19 between the hoses 11 and 12 normally is unpressurized or almost pressurized. If the inner hose 11 should start leaking, the pressurized liquid within the hose will escape into the space 19—such escape is indicated by an arrow 30—and subject this space and the sealed compartment 21 defined by one side of the piston 22 to an elevated pressure. As a consequence, the piston 22 will be displaced towards the valve body 27 (which is in its rest position at least initially), so that the flow-through passage 16 becomes blocked. The blocked condition is maintained as long as the elevated pressure in the sealed compartment and the pump pressure in the connector port 17 exist.

In order that the device may function properly in the last-described case, the space 19 of course has to remain sealed in fluid-tight manner, i.e. the sheath formed by the outer hose 12 has to be intact at least to the extent necessary for the required elevation of the pressure to occur. This may be assumed to be the normal case, however, because the outer hose is not normally subjected to pressure and thus is not subjected to stresses likely to cause it to leak.

In the above-described embodiment the device is "single-acting", in that it is assumed that the hydraulic liquid is pressurized only when flowing in one direction, namely, from the port 17 toward the coupling 13. However, it is within the scope of the invention to make the device "double-acting" by providing safety shut-off valves similar to the valve 15 at both ends of the hoses. This arrangement is preferred in the case where the hydraulic liquid can flow under pressure in both directions.

What I claim is:

1. A device for connecting a pressure fluid source to a fluid motor, comprising:
   (a) an inner conduit;
   (b) first connector means attached to one end of said inner conduit for connecting said inner conduit to the fluid motor;
   (c) an outer conduit surrounding said inner conduit and defining a sealed space around said inner conduit; and
   (d) a safety shut-off valve attached to said inner and outer conduits and having second connector means for being connected to the pressure fluid source, said safety shut-off means including
      (1) means defining a flow-through passage communicating with said second connector means and with the other end of said inner conduit,
      (2) means defining a sealed compartment in said valve,
      (3) means defining a fluid flow passage between said sealed space and said sealed compartment,
      (4) a pair of valve elements disposed in said flow-through passage and coacting as valve seat and valve body and independently relatively movable toward one another to a closed position in sealing engagement to block fluid flow through said passage, and away from one another to an open disengaged position to permit fluid flow through said passage,
      (5) means biasing each of said valve elements toward said open position,
      (6) one of said valve elements constituting a movable wall of said sealed compartment and being displaceable against its bias toward said closed position by elevated pressure in said sealed space and said sealed compartment, said elevated pressure being a build-up of fluid pressure produced by fluid leaking from said fluid flow passage through said inner conduit, and
      (7) the other of said valve elements being displaceable against its bias toward said closed position by fluid forces imposed on it by a liquid stream passing through said flow-through passage from said second connector means at a flow rate at least equal to a given maximum permissible flow rate.

2. A device according to claim 1, said one valve element being disposed on a piston displaceable in a cavity formed in said safety shut-off valve and communicating on one side of said piston with said space, said other valve element being displaceable toward and away from said first valve element and disposed on the upstream side thereof, said pair of valve elements being spring-biased away from one another.

3. A device according to claim 2, said other valve element being spring-biased toward an abutment by a force balanced by said fluid forces.

4. A device according to claim 2, said flow-through passage extending coaxially through said piston and said one valve element.

* * * * *